United States Patent
Mokhtari et al.

(10) Patent No.: US 10,348,086 B2
(45) Date of Patent: Jul. 9, 2019

(54) CONSTRUCT TO MITIGATE POWER SYSTEM OPERATIONAL IMPACTS OF EMERGING "DISRUPTIVE TECHNOLOGIES"

(71) Applicant: Open Access Technology International, Inc., Minneapolis, MN (US)

(72) Inventors: Sasan Mokhtari, Eden Prairie, MN (US); Ali Ipakchi, San Carlos, CA (US); Farrokh Albuyeh, San Carlos, CA (US); Abdolhossein Rahimi, Redwood City, CA (US); Behnam Danai, Cupertino, CA (US); Khashayar Nodehi Fard Haghighi, Maple Grove, MN (US); Ilya William Slutsker, Plymouth, MN (US); David Heim, Minneapolis, MN (US)

(73) Assignee: Open Access Technology International, Inc., Minneapolis, MN (US)

(*) Notice: Subject to any disclaimer, the term of this patent is extended or adjusted under 35 U.S.C. 154(b) by 640 days.

(21) Appl. No.: 14/680,661

(22) Filed: Apr. 7, 2015

(65) Prior Publication Data
US 2015/0288181 A1 Oct. 8, 2015

Related U.S. Application Data

(60) Provisional application No. 61/976,134, filed on Apr. 7, 2014.

(51) Int. Cl.
*H02J 3/00* (2006.01)
*G05B 15/02* (2006.01)
*G06Q 50/06* (2012.01)

(52) U.S. Cl.
CPC .............. *H02J 3/00* (2013.01); *G05B 15/02* (2013.01); *G06Q 50/06* (2013.01)

(58) Field of Classification Search
CPC ............ H02J 3/00; G06Q 50/06; G05B 15/02
USPC ........................................................ 700/291
See application file for complete search history.

(56) References Cited

U.S. PATENT DOCUMENTS

| | | | |
|---|---|---|---|
| 2002/0026394 A1* | 2/2002 | Savage ................ | G06Q 20/02 705/34 |
| 2005/0004858 A1* | 1/2005 | Foster .................. | G06Q 40/06 705/36 R |
| 2005/0197742 A1* | 9/2005 | Scott .................... | G06Q 40/04 700/286 |
| 2008/0177678 A1* | 7/2008 | Di Martini ............ | G01D 4/002 705/412 |
| 2010/0332373 A1* | 12/2010 | Crabtree .............. | G06Q 40/04 705/37 |

(Continued)

*Primary Examiner* — Chun Cao
*Assistant Examiner* — Alan Chu
(74) *Attorney, Agent, or Firm* — Vidas Arrett & Steinkraus P.A.

(57) ABSTRACT

A process/method is provided for the management of electric distribution system operations, including accurate and efficient communications and interfaces between the transmission, distribution and residential distribution systems, managed by a distribution system operator responsible for energy balance and reliability through control on a local distribution area, namely between end use customers and the transmission node of the electrical system.

19 Claims, 2 Drawing Sheets

(56) References Cited

U.S. PATENT DOCUMENTS

| | | | |
|---|---|---|---|
| 2010/0333105 A1* | 12/2010 | Horvitz | G06F 9/4893 718/105 |
| 2011/0196546 A1* | 8/2011 | Muller | H02J 3/383 700/295 |
| 2013/0085616 A1* | 4/2013 | Wenzel | G05F 1/66 700/278 |

* cited by examiner

CONSTRUCT TO MITIGATE POWER SYSTEM OPERATIONAL IMPACTS OF EMERGING "DISRUPTIVE TECHNOLOGIES"

CROSS-REFERENCE TO RELATED APPLICATIONS

This application claims priority to U.S. Provisional patent application no. 61/976,134 filed Apr. 7, 2014, the entire content of which is hereby incorporated by reference.

STATEMENT REGARDING FEDERALLY SPONSORED RESEARCH

Not Applicable

FIELD OF THE INVENTION

The present disclosure relates generally to maintaining reliability of electric power/energy systems and, more particularly, to constructs, systems, processes, and methods of ensuring the reliability of those systems while minimizing cost of electricity and facilitating the use of demand-side and distributed electric energy resources.

BACKGROUND OF THE INVENTION

The electric industry has been undergoing a paradigm shift for over a decade; moving away from the central-station utility and its typically one directional power flow towards a decentralized model where energy can be generated from any number of points on a power grid from any number of distributed energy resources (DER). Factors driving this shift include increasing interest in generation from renewable resources, advances in new storage and generation technologies, growing demand-side participation in system operations, and a greater public expectation of grid resiliency. All are working in concert to create a new form of "disruptive technology" that, while perhaps is rightfully considered to be preferred, favorable advances with many beneficial impacts, is threatening the reliable operation of the distribution system. With the shift, a new "prosumer" market player has emerged who owns and operates active (distributed generation) resources to reduce its net consumption and where possible inject its surplus power into the grid. The increasing penetration of these distributed, customer-side resources and prosumers will not only strike directly at the utility bottom line, but just as important, will also add to requirements for system reliability. No longer can the distribution system passively allow electricity to simply follow from the high voltage transmission grid to the lower voltage distribution and customer grids. Rather, tomorrow's grid must be able to support bi-directional power flow where electricity can be injected from any number of different generation sources at any number of entry points to the system. At a minimum, these changes give rise to new operational problems for operators of the distribution system. Utilities will need to extend their visibility to customer-side assets and revamp their conventional distribution system operational procedures and tools to maintain reliable system operations.

With increased levels of variable generation, bulk power system operators also face a number of new issues, including the need for higher levels of reserves, ramping requirements, and new types of balancing and flexible reserve services. Reliance upon conventional (generation) resources to meet these requirements is unlikely, as a shift to promoting environmentally friendly resources is well underway and the operation of such conventional resources could be cost prohibitive. Rather, demand-side assets are likely to be increasingly relied upon by bulk power system operations to supplement (or even replace) conventional resources to provide such services. This increasing reliance will drive system operators' desire for visibility into or even control over the demand-side assets of prosumers. However, such visibility is limited today by structural, technological, and jurisdictional factors as well as others.

A new group of market players have also emerged, referred to by various names such as Curtailment Service Providers (CSPs), Aggregators of Retail Customers (ARCs), or more generally as Demand Response service Providers (DRPs) that sign up consumers/prosumers, aggregate their responsive demand or distributed generation and offer them to entities such as system or market operators, pocketing the difference between incentives they pay to consumers/prosumers, and revenues they get from system/market operators. Since their incentives are purely economic, they are generally oblivious to reliability impacts their operations may have on the distribution system. There is a need for improved coordination and control among them, the consumers/prosumers, and the system operators.

In addition, many prosumers are interested in opportunities to lower their cost of energy and to maximize value of their demand-side assets by adjusting consumption in response to prices, offering flexibilities in their usage in return for payments or incentives, or even engaging into bilateral transactions with other consumers and prosumers. Although traditional transactive techniques have been used in bulk power operation and trading in the U.S. since the mid-nineties, the concept of transactive energy has been emerging in the retail energy domain, thus extending the conventional wholesale level trades of energy and energy derivative products to retail and end-use prosumers.

As a result, a need has emerged for a new entity, the Distribution System Operator (DSO), as well as the supporting technology, and platform and the processes, required to support the DSO (referred to hereinafter as the Distributed System Platform "DSP") to forecast distribution level demand and supply variations, and to the extent possible minimize the resulting imbalances to relieve the balancing burden on the bulk power operation. In addition, the DSP can aggregate demand-side flexibilities, or facilitate provisions of such capabilities by service provides, in support of the bulk and market operations. To maintain distribution system reliability such activities need to be coordinated and any adverse impact on distribution grid operations need to be analyzed, monitored and controlled. In carrying out this mission, to the extent possible, the DSP may use quantity, value, time, and location attributes.

The increased number of players and increased number of transactions places distribution grid reliability at risk. It is, therefore, of outmost importance for the operator of the distribution grid to have full visibility to these transactions, and the ability to exercise control, when needed. These issues have been developing for over a decade, yet prior to the systems and methods disclosed herein, no solution has been successful at mitigating them.

BRIEF SUMMARY OF THE INVENTION

In general, this disclosure is directed toward systems and methods for a Distribution System Platform (DSP) to enable the forecasting, scheduling and maintenance of electrical supply and demand schedules while faced with large numbers of distributed resources and players, maintaining distribution system reliability and, in some embodiments, linking wholesale and retail market agents.

Using the systems and methods described in this disclosure, a DSP is enabled to interface with both the bulk power system operators, such as, but not necessarily limited to, Balancing Authorities (BA), Independent System Operators (ISO) /Regional Transmission Organizations (RTO), and Utility Distribution Companies (UDCs), as well as various Demand Response service Providers (DRPs) and retail and end-use prosumer owner/operators of demand-side assets, such as, but not necessarily limited to, Building Energy Management Systems (BEMS), Microgrids, and variable generation resources. The direct interaction of the DSP with and between the bulk power system operators, retail service providers, prosumers, and other DR/DER asset owners using the systems and methods included in this description facilitate the reliable operation of a distribution system and may create market opportunities for various demand side participants while also providing visibility into and/or control of demand side assets to maintain electrical supply and demand schedules and minimize any deviations.

The systems and methods described herein can be embodied in several degrees of implementation ranging from a minimal DSP functionality implementation, which is capable of receiving, sending and processing data to facilitate dispatch, real time control and reliability coordination, to a maximalist DSP functionality, which can receive, send and process data to facilitate expanded operations scheduling, dispatch and control of demand response (DR) and distributed electric resources (DER), expanded metering and settlement functionality and may support of a full, distribution level market place for bids, offer, and bilateral transactive deals amongst DR/DER asset owners/operators and consumers/prosumers. Preferred embodiments of the systems and methods of this application, regardless of the degree of implementation, are capable of receiving, sending and processing data to facilitate some basic responsibilities at the DSP-operator level, including distribution system planning, reliability, and protection.

The inventive systems and methods utilize the unique position of the DSP to send, receive, and process various data in order to provide reliability, condition visibility and market functionality that is not readily available to either a bulk system operator or a prosumer/DR/DER asset owner. The DSP can collect data such as, but not necessarily limited to, distribution network topology, "as operated switching" information, distribution chokepoints, and distribution chokepoint limits (generally "Distribution Operator Data"). In some embodiments, the DSP may also be able to receive and process DR/DER request for distribution reliability from a utility distribution operation center. From the prosumer/demand side operators, the DSP may receive and process data such as, though not necessarily limited to, DR/DER status, customer information, DR metering data (generally "Customer Data"). In some embodiments, the DSP may also be able to receive and process DR/DER Asset Control capabilities and responses form DSP initiated Dispatch/Control actions as well as perform customer enrollment actions.

The DSP can then utilize and, in some embodiments, manipulate gathered data to provide various information, including but not necessarily limited to, available DR/DER by Distribution Grid and/or chokepoint location and DR/DER schedules. Similarly, in some embodiments, the DSP can utilize and, in some embodiments, manipulate gathered data to provide various information to utilities or DR/DER asset owners, including but not necessarily limited to, DR/DER Program Information, DR/DER Customer performance information, DR/DER dispatch/control actions, and DR/DER customer billing determinants. In further embodiments, the DSP may monitor and provide real-time marketplace information to various market participants at various levels of distribution grid participation, such as but not necessarily limited to utilities, prosumers, or other power marketers. In some embodiments, DSPs may utilize any means known in the art to communicate real time processing of bids, offers and bilateral transactive deals to multiple system users in order to facilitate a functional marketplace for such commodities.

In preferred embodiments, the DSP will then manipulate and analyze all relevant collected data to determine whether reliability concerns are present on the local distribution grid. In some embodiments, the DSP may communicate this distribution reliability impact information to a BA or RTO/ISO for consideration. In other embodiments, the DSP may perform and execute actions on its own to restore acceptable reliability levels within a local distribution area. In other preferred embodiments, the DSP will utilize collected data to perform system planning for increased reliable operation of the power distribution system.

In at least one embodiment, this disclosure is directed to a computer program for use with a graphics display device, the computer program comprising a computer usable medium having computer readable program code embodied in the medium for facilitating the systems and methods described herein, more specifically computer program code for the input of various data, user enrollment and registration of assets, calculation and modeling of asset characteristics, aggregation of modeled assets and asset characteristics, and revaluation and/or recalculation of asset models.

The invention may take the form of a system for a DSP to maintain electrical supply and demand schedules and minimize imbalances, and thereby reduce the reserve and balancing requirements on bulk power operation, while maintaining distribution system reliability, and linking wholesale and retail market agents configured to:

1, Obtain Distribution System Data and Customer Data, 2, analyze said data to determine forthcoming imbalances and reliability concerns, 3, communicate reliability concerns to distribution system operators for action, or administer corrective action as deemed necessary, 4, communicate said data to Utilities, BAs, ISOs, RTOs and Prosumers/DR/DER asset owners as relevant, and 5, communicate or facilitate DR/DER actions as deemed appropriate.

The invention may also include a method to enable a DSP operator to maintain electrical supply and demand schedules, and thereby minimizing imbalances, maintain distribution system reliability, and link wholesale and retail market agents by:

1, Obtaining Distribution Operator Data and Customer Data, 2, analyzing said data to determine reliability concerns, 3, communicating reliability concerns to distribution system operators for action, or administer corrective action as deemed necessary, 4, communicating said data to Utilities, Bas, ISOs, RTOs and Prosumers/DR/DER asset owners as relevant, and 5, communicating or facilitate DR/DER actions as deemed appropriate.

The details of one or more aspects of the disclosure are set forth in the accompanying drawings and the description below. Other features, objects, and advantages will be apparent from the description and drawings, and from the claims.

DETAILED DESCRIPTION OF THE INVENTION

Figure 1:
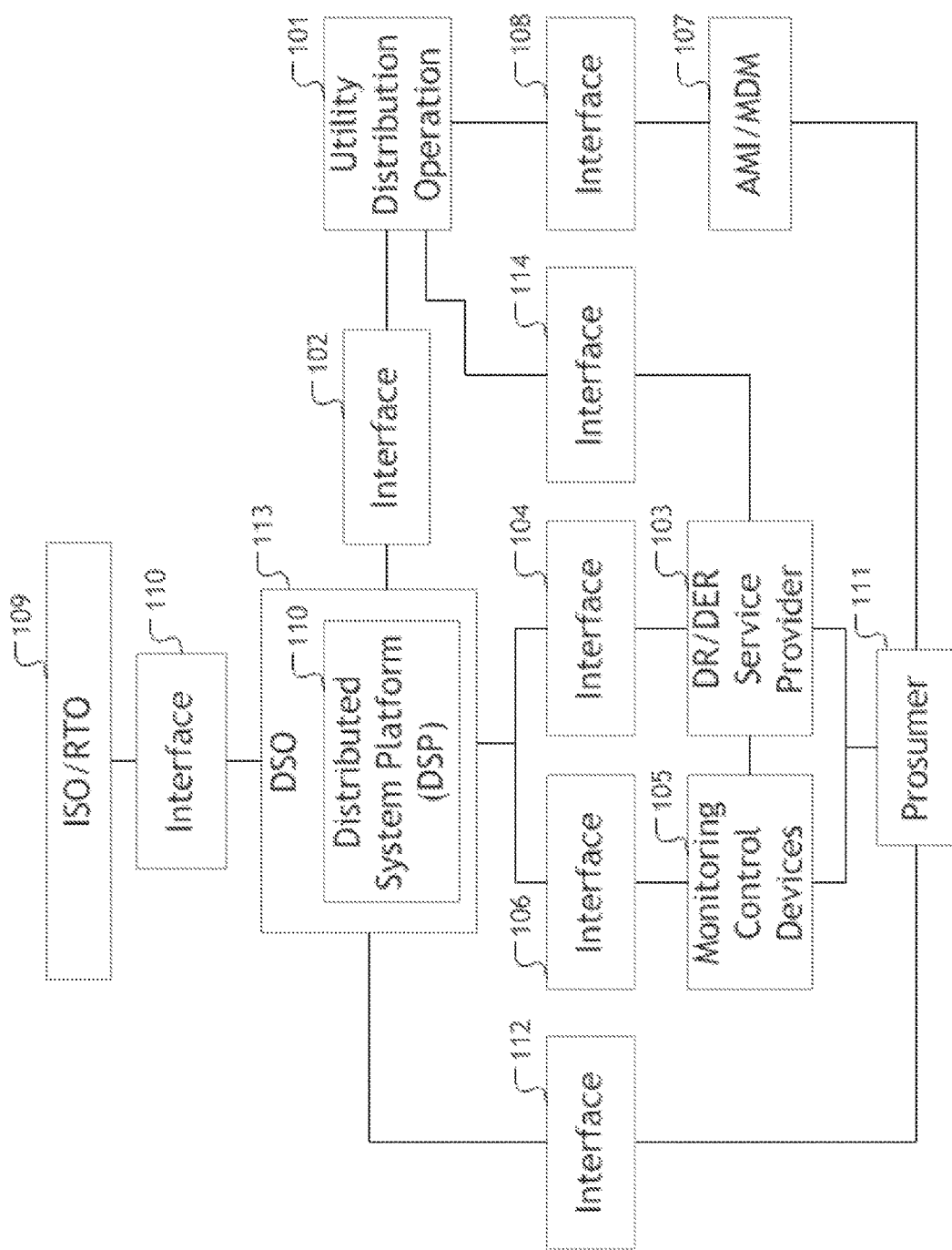
FIG. 1 is a diagram illustrating an example of the participants of a particular embodiment of the described invention.

While this invention may be embodied in many forms, there are specific embodiments of the invention described in detail herein. This description is an exemplification of the principles of the invention and is not intended to limit the invention to the particular embodiments illustrated.

In general, this disclosure is directed toward methods for managing distribution system operations. A DSO is defined as an entity and the associated processes to enable development and greater participation of DR and DER in support of power system economic and reliability, by facilitating retail markets while ensuring distribution grid reliability and closing the gap between distribution and bulk power operations as well as retail and wholesale energy markets. In preferred embodiments, such DSO is responsible for the distribution facilities, utility customers, and other generation and loads on a local distribution area, which is typically the distribution system connected below one or more interface points between the transmission and distribution systems. A DSP is defined as the supporting technology, platform, and processes, required to support the DSO (or similarly placed entity). It is assumed that each such local distribution area will be comprised of multiple generation resources, (conventional and non-conventional, distributed or otherwise), utility customer loads, power control systems, and load management capabilities.

The inventive systems and methods utilizing the DSO/DSP effectively maintain distribution system reliability to 1) ensure safe, reliable, and efficient distribution service, 2) manage distribution grid congestion, 3) assess DER and DR availability and coordinate their operation, and 4) balance variations in electrical demand and supply through dispatch of various distribution system resources including DR and DER. Efficient distribution service is enhanced through utilization of the described systems and methods by enhancing operator visibility to distribution grid assets and operating conditions and monitoring distribution system operating conditions against reliability limits including voltages, line flows and phase imbalances. Likewise, distribution grid congestion management can be more cohesively implemented through adoption of the described systems and methods to accomplish dispatch of DR and DER for feeder load relief and dispatch of reactive resources for voltage control.

Particular embodiments of the invention may also facilitate a retail market. Said markets may support the bilateral and market-based transactive interactions between various prosumers, service providers, and distributed resource owners and operators. These particular embodiments of the described invention facilitate transactions between prosumers, service providers, and distributed resource owners and operators and wholesale energy markets in a unified marketplace between traditional retail and transmission energy markets. Moreover, some embodiments of the invention may be employed to promote planning for future development of distributed energy resources based on economic signals.

The systems and methods described herein transfer data from any one entity to another is accomplished through any means known in the art that deliver such data reliably and in a timely manner. As the energy industry has rightfully placed increased importance on cyber security, the preferred embodiment would communicate such data securely as well as in near real time.

Turning to FIG. 1, the invention comprises of many interfaces between various participating entities or locations. Interfaces 102 exist between DSP 100 and a utility distribution company 101 to obtain various information, including but not necessarily limited to, distribution network topology model and topology updates, operating limits for distribution bottlenecks, utility customer information. In some embodiments, Interface 114 may exist between utility distribution company 101 and DR/DER Service Provider 103 in order to exchange some of this information between those two entities before it is passed to DSP 100. Distribution network topology model and topology updates are sent from a distribution utility's 101 SCADA/DMS and GIS systems to the DSP 100 for various uses including developing distribution grid network model and topology. Operating limits for distribution Bottlenecks are also obtained from a distribution utility's 101 SCADA systems, but utilized by the DSP 100 for determining operating margins for distribution grid equipment among various other known uses. Utility customer information is sent from a distribution utility's 101 Customer Information System (CIS) and Customer Relationship Management Systems (CRM) in order to obtain updated customer registration/enrollment information. In preferred embodiments, regular synchronization of this data between the utility CIS/CRM and the DSP 100 is performed on a periodic basis.

Interfaces may also exist between the DSP 100 and any of several participating external entities, such as are similar to ISO/RTOs 109, Utility Distribution Operation 101, or DR/DER Service Provider 103 to obtain various information, including but not necessarily limited to, customer/prosumer schedules, dispatch, and service requests, telemetry data, Metering data, and customer/prosumer performance and settlements determinants. Customer/prosumer schedules, dispatch, and service requests may be sent from Distribution Utilities 101 CRM and DR/DER Service Providers 103 demand response management system (DRMS) to the DSP 100 for use in determining DR/DER capabilities and availability of a DR/DER service provider 103 via an interface 104. Current operating conditions are determined by the DSP 100 obtaining telemetry data, reported from monitoring and control devices 105 distributed in the field via interface 106. The loadings on the distribution grid, DR/DER performance monitoring, and settlement with customers can be determined by the DSP 100 through the receipt of monitoring data from interfaces 108 with advanced metering infrastructure (AMI) and/or meter data management systems (MDM) 107 deployed for use within a local distribution area. Utility customer/prosumer performance and settlements determinants are obtained by the DSP 100 from a distribution utility's 101 CIS, rate schedules and communicated Tariffs. These determinates can be utilized for various reasons, including but not necessarily limited to, calculating settlement statements, billing, and invoicing.

A DSP 100 may operate on several time horizons to maintain reliability and local distribution area system balance including a pre-operational timeframe (up to and including the Day-Ahead (DA) operations planning), operational timeframe (a few hours ahead of the operating hour up to the Real-Time operation) and a post-operational timeframe. In a pre-operational time-frame DSP 100 will perform DR/DER customer and asset qualification and registration, receive distribution grid topology, forecast system conditions, forecast operational requirements, assess resource adequacy, and will receive schedules, bids and offers from market participants, and residual energy and ancillary service requirements from an ISO/RTO 109 interface 110. In the operational timeframe, DSP 100 will update distribution grid topology, update forecasts and operating requirements, and will receive updated schedules, bids and offers from market participants, and updated residual energy and ancillary service requirements from the ISO/RTO 109. In this time frame, the DSP 100 will perform congestion management, market clearing and will issue notifications and dispatch instructions. In the post operations time frame, The DSP 100 will receive actual metering information, perform measurement and verification, assess performance, and receive settlement statements form ISO/RTO 109, as relevant and, compute and issue settlement statement to the DSP 100 market participants. It will also receive and resolve participant disputes.

Figure 2:
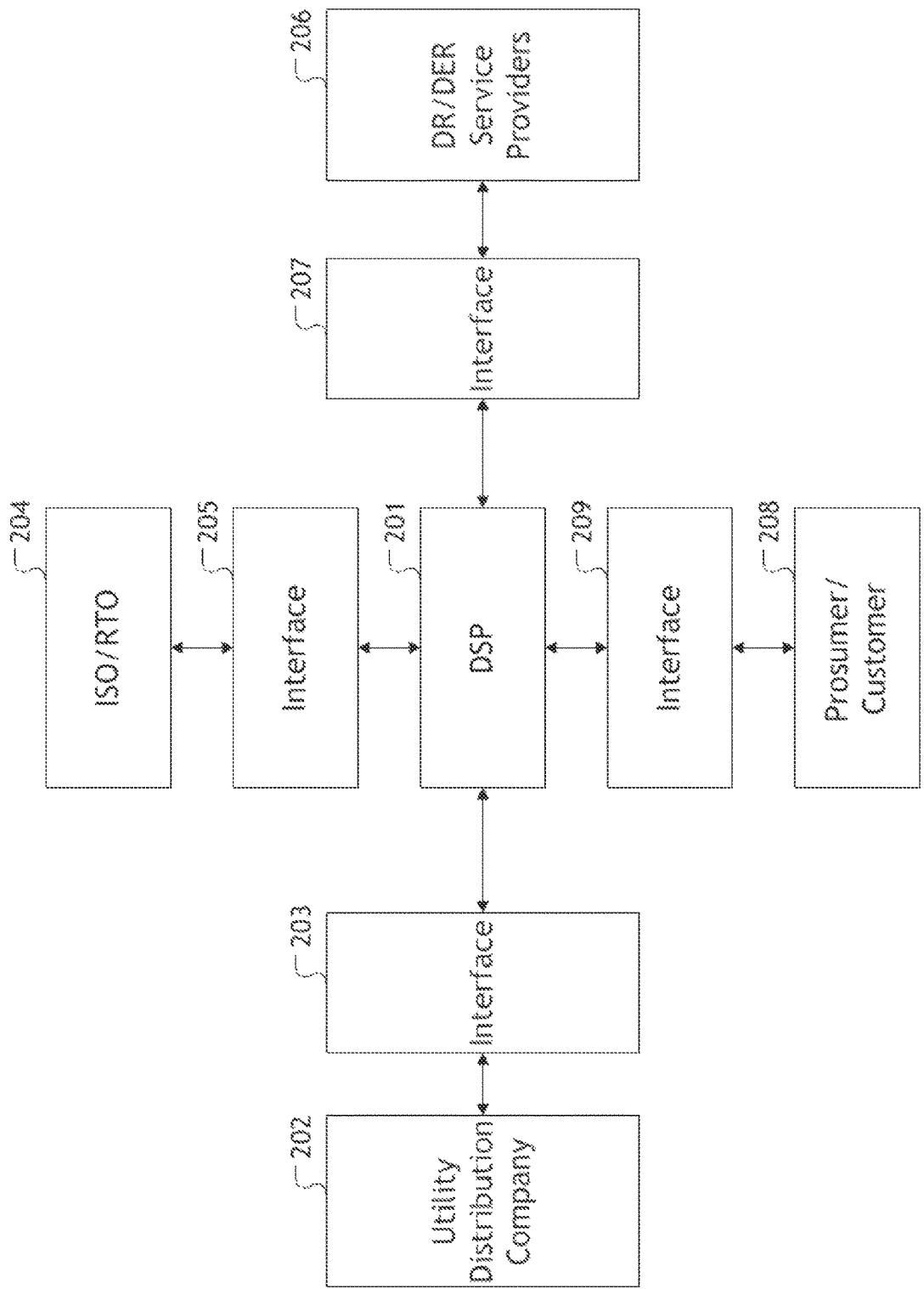
FIG. 2 is a diagram illustrating an example of the communication interfaces among the participants of a particular embodiment of the described invention, which facilitate the communication of various information.

Turning to FIG. 2, during the pre-operational timeframe of the systems and methods of the disclosed invention, various data may be exchanged to facilitate the performance of tasks, including but not necessarily limited to those described in the following illustrative example. In general, information is sent to and from the DSP through various interfaces with the various participating entities such as interface 203 with utility distribution company 202, Interface 205 with ISO/RTO 204, interface 207 with DR/DER service provider, and interface 209 with Prosumer/utility customers 208. In one particular embodiment, a DSP 201 may receive DR/DER Asset Registration information including asset characteristics and distribution grid interconnection points from a distribution utility's 202 CIS and CRM, as well as other participants' data systems for various uses including but not necessarily limited to determining the DR/DER capacities and capabilities. The DSP 201 may also import distribution capacity limits for target distribution bottlenecks from the distribution utility's 202 SCADA/DMS in order to calculate operating margins for distribution grid equipment. A DR Provider, such as the utility 202 or Curtailment Service Provider (CSP) may send DR-DER availability forecasts to the DSP 201 for forecasting DR/DER capabilities among other uses. In one particular embodiment, the DR-DER availability forecast may be based on pre-specified geographical and temporal granularity related to the local distribution area. In another embodiment, the DSP 201 may calculate forecasted availabilities based on equipment characteristics and forecasted exogenous parameters through processes known in the art. DSP participants, such as though not limited to, utility distribution companies 202, ISO/RTO/BAs 204, or DR/DER providers 206, may send bilateral DR-DER schedules, including source and sink locations or other distribution event attributes to facilitate the determination of their impacts on the distribution grid reliability. The source and sink locations may be service delivery points, distribution substations, etc. In some instances, may also include the phase connectivity (A, B, C, two, or three-phases). In some embodiments, DR program opt-in or opt-out information may be relayed to the DSP 201 by participating customers/prosumers 208 or indirectly through utility or service providers 202 for various uses, including but not necessarily limited to the determination of active schedules, their forecasted capacities and capabilities and for billing and settlement purposes.

In some embodiments, in the pre-operation time frame a DSP 201 can receive bids and offers from DSO Market Participants in order to establish bid-based DR/DER schedules. The DSP 201 can also receive DA location marginal prices (LMPs) including DA LMPs published by the ISO/RTO 204 subject to distribution uplift charges to represent distribution level marginal prices. Using processes known in the art, the DSP 201 may utilize day ahead LMPs to provide optimum schedules and operating strategies for cost effective and reliable energy distribution to various DSP participants.

The invention may facilitate comprehensive, accurate operations scheduling in the pre-operations horizon. In some embodiments, DR-DER based Ancillary Service quantities may be provided from within the local distribution area or DSO footprint by DSP market participants to the ISO/RTO market via interface 205 with the ISO/RTP 204 or used for Distribution Reliability measures. Determination of available ancillary services in support of distribution grid operations and for bidding into the ISO/RTO markets in support of wholesale power operations. In turn, the ISO/RTO 204 my send the DSP 201 information regarding DR and DER cleared schedules, if any, to facilitate the DSP's 201 creation of operation scheduling. The DSP 201 may then send market information, including prices and forecasts, to market participants for operation planning and scheduling. At the same time, the DSP 201 may send notifications regarding forecast distribution bottleneck limits and anticipated limit violations, if any, to utility distribution company 202 for operations and operations planning activities. The DSP 201 may then, or at the same time, send information regarding energy and ancillary services available from DR/DER to the ISO/RTO 204 market, if any exist, for wholesale market operations planning and market clearing. Finally, though not necessarily last in all embodiments, the DSP 201 may send information regarding DR and DER cleared schedules, if any, to market participants to further facilitate operations scheduling by said market participants.

In one particular embodiment of the system and methods of this invention, during the operational timeframe, a DSP 201 may first receive updates to network topology, operating and bottleneck limits and system conditions from distribution utility's 202 SCADA/DMS and GIS systems. In this embodiment, the DSP 201 utilizes this data to develop distribution grid network model and topology. The DSP 201 then receives and processes updates to DR/DER availability forecasts, opt-in/out, bilateral schedules, and, bids and offers from the DSO participating entities identified above, to perform updates to the DSP 201 operational model.

Wholesale market information updates, including ancillary services requirements, are then communicated from ISO/RTO 204 to the DSP 201 to update real-time schedules and operating strategies. Telemetry data from distributed assets is provided from AMI/MDM systems managed by utility distribution company 202, DR. DER service provider 206 or the prosumer/utility customers 208 themselves to the DSP 201 as required and available to assess current system conditions. The DSP 201 may also receive new or updated bids and offers from DSO Market Participants to update real-time market operations. Utility distribution companies 202 then communicate dispatch instructions from distribution operations center for maintaining distribution reliability and/or distribution system balancing to the DSP 201 for determination of the amount of load relief, voltage control or balancing requirements required for system balancing. The DSP 201 may next receive and process real-time dispatch instructions for aggregated resources or virtual power plants (VPPs), if any, from the ISO/RTO 204. The DSP 201, in turn, will process the received instructions to prepare appropriate messages to facilitate real time dispatch of DR/DER assets.

The DSP 201 will then receive real-time LMPs from the ISO/RTO 204 and initiate real-time market-based dispatch and send notifications to all participants, following any pre-set or ad hoc notification based dispatch instructions.

If the real-time dispatch instructions received from the ISO/RTO 204 require communication to end use devices, then utility 202, service providers 206, prosumers 208, and utility customers 208 will receive real-time dispatch and/or Direct Load Control commands to dispatchable resources (DR, DER, etc.), if any, from the DSP 201 in order to adjust levels per the dispatch instructions. The DSP 201 may also send distribution marginal prices (with sub-hourly resolution) to DSO market participants, including directly to participating price-responsive devices, to adjust DR/DER operating set points.

Finally, in one particular embodiment of the system and methods of this invention, a DSP 201 may, during the post-operational timeframe, receive interval metered data consistent with scheduled resources from utilities 202, service providers 206 and other participants in order to carry out performance assessment, settlement and billing. The DSP 201 may receive settlement statements from ISO/RTO 204 for any products and services scheduled or offered through the DSP 201 in order to facilitate the preparation of participant settlement allocations.

Settlement statements, including charges and credits to DSO market participants, may then be sent from the DSP 201 to DSO market participants (including utility 202, service providers 206 and utility customers/prosumers 208). These settlement statements may include financial compensation for participation in DR-DER programs, as well as penalties for non-performance. In some embodiments, the DSP may also receive disputes and inquires pertaining to the settlement statements from any market participant, which would initiate a settlement dispute resolution of some kind particular to the entity operating the DSP 201.

Utilizing the systems and methods of the described invention, a DSP 201 is able to facilitate reliable operation of a local distribution area with minimal impact on existing BA, RTO, and ISO systems.

The invention claimed is:

1. A method for managing distribution system operations, said method comprising operating the distribution system operations on several time horizons, including a pre-operational timeframe, operational timeframe and a post-operational timeframe including the following steps:
   a. Receiving DR/DER asset registration information;
   b. Receiving distribution capacity limits from a utility;
   c. Receiving opt-in/opt-out data;
   d. Receiving bilateral DR-DER schedules and ancillary service quantities from DSO Market Participants;
   e. Receiving bids and offers from DSO market participants;
   f. Receiving DA LMPs from an ISO/RTO;
   g. Receiving information regarding DR and DER cleared schedules from an ISO/RTO;
   h. Sending notifications regarding forecast distribution bottleneck limits and anticipated limit violations to a utility;
   i. Sending information regarding energy and ancillary services available from DR/DER to ISO/RTO markets;
   j. Sending information regarding DR and DER cleared schedules to Market Participants and
      wherein the operational timeframe, the distribution system operations will update distribution grid topology, update forecasts and operating requirements, and will receive updated schedules, bids and offers from market participants, and updated residual energy and ancillary service requirements from the ISO/RTO.

2. The method of claim 1, further comprising receiving DR-DER availability forecasts from a DR provider.

3. The method of claim 1, further comprising calculating DR-DER availability forecasts based on said asset registration information.

4. The method of claim 1, wherein said opt-in/opt-out data are received from prosumers.

5. The method of claim 1, wherein said opt-in/opt-out data are received from a utility or other service provider.

6. The method of claim 1, wherein at least some of the information received or sent is updated for real-time operations.

7. The method of claim 6, wherein at least some of the information updated is updated by receiving asset telemetry data.

8. The method of claim 6, further comprising receiving dispatch instructions from a distribution operations center.

9. The method of claim 8, wherein said dispatch instructions are instructions for aggregated resources.

10. The method of claim 8, further comprising communicating said dispatch instructions to participants.

11. The method of claim 10, wherein said dispatch instructions are sent directly to participants' assets in the form of control commands.

12. The method of claim 6, further comprising sending distribution marginal prices to DSO market participants.

13. The method of claim 12, wherein said marginal prices are sent directly to DSO market participants' assets.

14. The method of claim 1, further comprising receiving interval metered data relating to scheduled assets or resources.

15. The method of claim 1, further comprising receiving settlement statements for products and services from an ISO/RTO.

16. The method of claim 15, further comprising sending settlement statements to DSO market participants.

17. The method of claim 16, wherein said settlement statements include charges and credits.

18. The method of claim 1, further comprising receiving disputes from market participants.

19. A method for managing distribution system operations, and operating the distribution system operations on several time horizons, including a pre-operational timeframe, operational timeframe and a post-operational timeframe including, said method comprising the following steps:
   a. Receiving DR/DER asset registration information;
   b. Receiving distribution capacity limits from a utility;
   c. Receiving opt-in/opt-out data;
   d. Receiving bilateral DR-DER schedules and ancillary service quantities from DSO Market Participants;

e. Receiving bids and offers from DSO market participants;
f. Receiving DA LMPs from an ISO/RTO;
g. Receiving information regarding DR and DER cleared schedules from an ISO/RTO;
h. Sending notifications regarding forecast distribution bottleneck limits and anticipated limit violations to a utility;
i. Sending information regarding energy and ancillary services available from DR/DER to ISO/RTO markets;
j. Sending information regarding DR and DER cleared schedules to Market Participants, and
   wherein in the pre-operations timeframe, the distribution system operations will determine available ancillary services, and will send information regarding DR/DER cleared schedules, send market information, including prices and forecasts to market participants for operation planning and scheduling.

* * * * *